United States Patent [19]

Staudenrausch

[11] Patent Number: 5,049,108
[45] Date of Patent: Sep. 17, 1991

[54] METHOD AND APPARATUS FOR DIVIDING INTO INDIVIDUAL SAUSAGES A CONTINUOUS SAUSAGE STRAND PROVENIENT FROM A FILLING MACHINE

[75] Inventor: Georg Staudenrausch, Biberach an der Riss, Fed. Rep. of Germany

[73] Assignee: Albert Handtmann Maschinenfabrik GmbH & Co. KG, Biberach an der Riss, Fed. Rep. of Germany

[21] Appl. No.: 475,166

[22] Filed: Feb. 5, 1990

[30] Foreign Application Priority Data

Apr. 11, 1989 [DE] Fed. Rep. of Germany ....... 3911859

[51] Int. Cl.⁵ ............................................. A22C 11/00
[52] U.S. Cl. ........................................ 452/48; 452/47; 426/105
[58] Field of Search ........................ 17/34, 1 F, 33, 49; 426/105, 135, 140; 452/46, 47, 48, 51

[56] References Cited

U.S. PATENT DOCUMENTS

| | | | |
|---|---|---|---|
| 4,073,039 | 2/1978 | Müller et al. ......................... | 17/1 F |
| 4,438,545 | 3/1984 | Kupcikevicius et al. ............... | 17/34 |
| 4,463,477 | 8/1984 | Ziolko ................................. | 17/1 F |
| 4,563,792 | 1/1956 | Niedecker ............................ | 17/33 |

FOREIGN PATENT DOCUMENTS 2546733 4/1977 Fed. Rep. of Germany .......... 17/33

Primary Examiner—Willis Little
Attorney, Agent, or Firm—Finnegan, Henderson, Farabow, Garrett & Dunner

[57] ABSTRACT

A method and apparatus for dividing into individual sausages a sausage strand exiting from a filler machine, wherein the sausage strand is rotated about its longitudinal axis and constricted by revolving constrictor elements, the thus divided sausages being provented from being further rotated, in which the apportioned size and length of the sausages can be varied by varying the revolving speed of the constrictor elements during the inoperative phase of their revolution relative to their revolving speed during their engagement with the sausage strand by providing the constrictor elements with a separate electric drive mechanism, the rotational speed of which is controlled by an electronic contol unit during its revolution.

7 Claims, 2 Drawing Sheets

METHOD AND APPARATUS FOR DIVIDING INTO INDIVIDUAL SAUSAGES A CONTINUOUS SAUSAGE STRAND PROVENIENT FROM A FILLING MACHINE

BACKGROUND OF THE INVENTION

The invention relates to a method for dividing into individual sausages a continuous sausage strand exiting from a sausage filling machine, wherein said sausage strand is rotated about its longitudinal axis and constricted at preselected spaced locations by means of revolving constrictor elements so as to be divided into individual sausages the sausages are subsequently prevented from being rotated while being conveyed further at a preselected conveying speed. It also relates to an to apparatus for dividing into individual sausages a continuous sausage strand exiting from a sausage filling machine, comprising a device for rotating said sausage strand, a divider mechanism including two constrictor elements revolving in opposite directions, and a conveyor device for further conveying the thus divided sausages while preventing them from being rotated.

A known apparatus of this type is provided with an electric motor operatively connected by a belt transmission to a filler pump producing the continuous sausage strand, and additionally operable to drive the conveyor device by way of a variable-speed belt transmission. The conveyor device comprises two endless chains disposed on opposite sides of the sausage strand and carrying bar members for gripping the sausages and divider elements for constricting the sausage strand.

Disposed upstream of this conveyor device is a chuck mechanism operable to rotate the sausage strand and driven by the variable-speed belt transmission of the conveyor device.

In this known apparatus the advancing speed of the sausage strand is determined by the filler pump which is driven at a constant speed. The sausage strand is then rotated by the continuous revolving chuck mechanism. Downstream of the chuck mechanism, the divider elements of the endless chains are brought into mutual engagement to thereby constrict the sausage strand, resulting in the strand being twisted at this location, because the bar members of the endless chains prevent the downstream section of the sausage strand from being rotated The weight of the sausages, i.e. the size of the portions can be slightly varied by varying the revolving speed of the endless chains relative to the operating speed of the filler pump by means of the variable-speed belt transmission. The length of the sausages can by contrast only be varied by exchanging the endless chains with other ones on which the restrictor elements are mounted at a different spacing.

This known apparatus thus permits the apportioned size of the sausages to be varied only within a very restricted range. This requires the revolving speed of the endless chains to be additionally varied, so that the advancing speed of the sausage strand produced by the filler pump can no longer be properly synchronized with the conveying speed of the endless chains. Although this known apparatus has been improved (U.S. Pat. No. 4,614,005) by an adjustable mounting of the constrictor elements on the endless chains, the adjustment of the constrictor elements is onerous and time- consuming and permits the length of the sausages to be only varied by discrete steps.

It is therefore an object of the invention to provide a method and apparatus permitting the apportioned size and length of the sausages to be varied within a wide range and permitting the desired portion sizes and lengths to be adjusted in a readily reproducible manner.

SUMMARY OF THE INVENTION

For attaining this object the invention provides a method for dividing a continuous sausage strand comprising the steps of:
a) discharging continuously a stuffed sausage strand from a filling machine;
b) rotating said strand about its axis as it moves downstream from said machine;
c) constricting said strand at preselected spaced locations with a pair of rotating constrictor elements that rotate periodically into closely spaced position to divide the strand into individual sausages, said elements rotating about an axis perpendicular to the axis of the strand on either side of the strand, the rotational speed of the constrictor elements being variable between their speed when they are in engagement with the strand and the speed when they are disengaged from the strand to thereby vary the length of the divided sausages; and
d) subsequent to completion of the constricting step, continuously conveying the thus divided sausage strand away from the rotating elements while preventing it from being rotated. It also provides an apparatus for dividing a continuously moving sausage strand exiting from a filling machine into individual sausages comprising twisting means for rotating said sausage strand about its axis, a constrictor mechanism for dividing the strand into individual sausages, said mechanism comprising a pair of constrictor elements mounted for rotation in opposite directions on either side of said strand and adapted to be brought into closely spaced position relative to one another to periodically engage and thereby constrict said sausage strand and drive means for rotating said elements, conveyor means located downstream of said constrictor mechanism for conveying the thus divided sausage strand away from said mechanism while preventing it from being rotated and control means for varying the rotational speed of the constrictor elements between the time they are engaged with the continuously moving strand and the time they are disengaged therefrom to thereby vary the length of said divided sausages.

By this invention is possible, and without any alteration or replacement of mechanical components, to cause the constrictor elements to revolve for instance at a reduced speed when not in engagement with the sausage strand to thereby increase the apportioned size and also the length of the sausages within wide limits.

When the device for rotating the sausage strand is likewise provided with a separate drive mechanism in the form of an electric motor, the length of the sausages can be still further increased by causing the electronic control unit to temporarily stop the revolution of the constrictor elements when not in engagement with the sausage strand and by additionally causing the device for rotating the sausage strand to be likewise intermittently driven.

In order to permit the revolving speed of the constrictor elements during their engagement with the sausage strand to be synchronized with the conveying speed of the conveyor device, it is also possible according to the invention to provide a separate drive mechanism in the form of an electric motor for the conveyor device. This is particularly important in the case of a more viscous filling mass.

All of the electric motors used for separate drive mechanisms are suitably controlled by the electronic control unit, so that the sausage filling and dividing operations can be entirely carried out under programmed computer control.

It is also possible to reproducibly and accurately divide a sausage strand into portions of continuously variable lengths by merely preselecting the apportioned volume, the number of portions and the sausage caliber for a wide range of sausage calibers.

According to the invention the electric drive mechanism for the constrictor elements may comprise a variable-speed electric motor and a transmission having two output shafts disposed on opposite sides of the sausage strand, each output shaft being provided with a pennant-shaped constrictor element. Each constrictor element may be releasably mounted on its respective output shaft for replacement by a different one for a different range of sausage calibres. This permits the apparatus to be quickly and readily converted for processing different calibres.

BRIEF DESCRIPTION OF THE DRAWINGS

Further characteristics and advantages of the invention will become apparent from the following description by way of example of an embodiment with reference to the accompanying drawings, wherein.

DETAILED DESCRIPTION OF THE INVENTION

Figure 1:
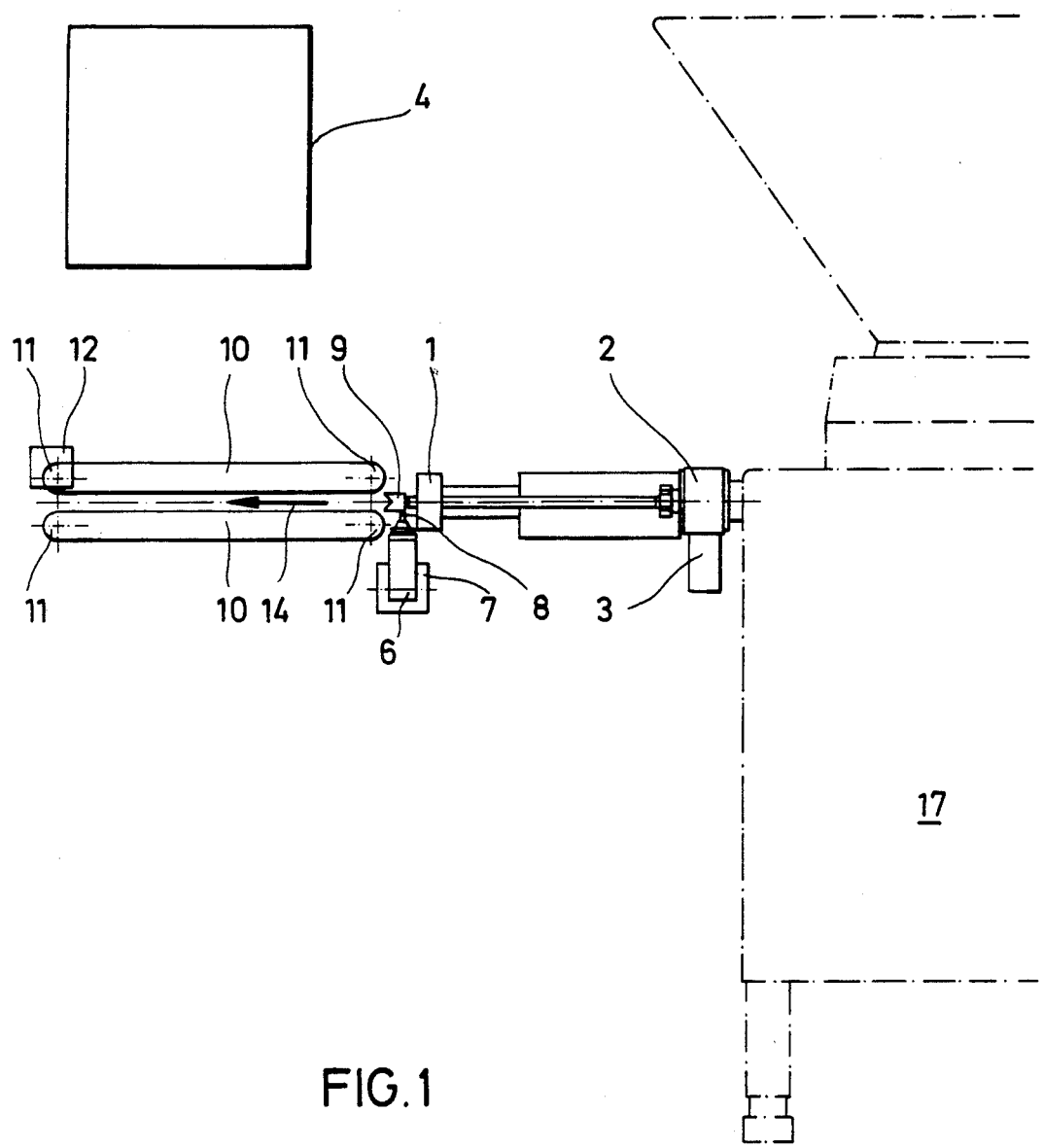
FIG. 1 shows a diagrammatical sideview of the apparatus according to the invention.

Shown in FIG. 1 by dash-dotted lines is a filler machine 17 operable to continuously discharge a mass of sausage meat in the form of an extrusion to be injected into a sausage skin in the conventional manner. The thus produced sausage strand 5 (See FIG. 2) is advanced through the concentric opening of a twisting means comprising a retaining ring 1 adapted to be rotated by a twister transmission 2 and to impart its twisting rotation to sausage strand 5.

Twister transmission 2 is driven by an electric motor 3 the rotational speed of which is controlled by an electronic control unit 4.

Figure 2:
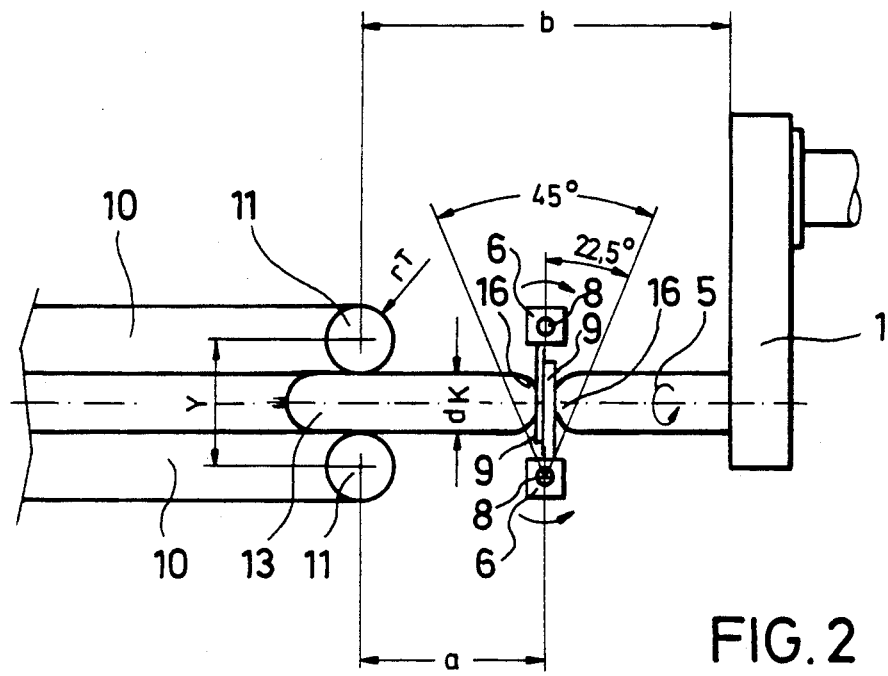
FIG. 2 shows a top plan view of parts of the apparatus, with the conveyor belts rotated about 90°.

As shown in FIG. 2, immediately downstream of retaining ring 1, sausage strand 5 enters a divider mechanism comprising a pair of constrictor units 6. The two constrictor units 6 are operatively connected to a drive means such as an electric motor 7, the rotational speed of which is likewise controlled by electronic control means 4.

Electric motor 7 is structurally combined with a transmission 18 (now shown) having two output shafts 8.

Plugged onto each output shaft 8 and rigidly connected thereto is a respective constrictor element 9.

Disposed downstream of the divider mechanism is a conveyor means composed of two endless conveyor belts 10 supported SB on respective return pulleys 11, selected ones of which act as drive pulleys operatively connected to a variable-speed electric motor 12 itself again controlled by electronic control unit 4 (FIG. 1).

Conveyor belts 10 are driven to revolve in opposite directions to convey the divided sausages 13 onwards in the direction of arrow 14.

Figure 3:
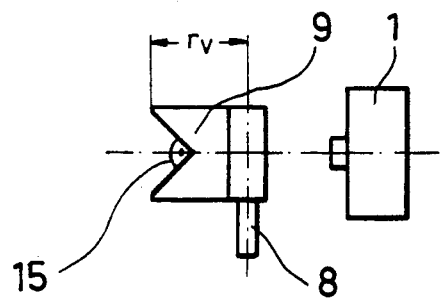
FIG. 3 shows a detail of the apparatus.

Each constrictor element 9 is mounted on its respective transmission output shaft 8 in the manner of a pennant and formed with a V-shaped cutout 15 opening towards sausage strand 5 (FIG. 3). The two constrictor elements 9 are adapted to mesh with one another for constricting the sausage string to thereby divide it into individual sausages.

The apparatus as a whole operates as follows

The sausage strand 5 exiting from filling machine 17 is caused to rotate by retaining ring 1, itself rotated by electric motor 3 through transmission 2 as indicated by an arrow in FIG. 2.

The two constrictor elements 9 are driven to revolve in opposite directions and come into contact with the rotating sausage strand 5 when they enclose an angle of about 45° depending on the calibre of the sausage strand (cf.FIG.2).

As long as constrictor elements 9 are thus engaged with sausage strand 5, their revolving speed is controlled in such a manner that the revolving speed of the point of intersection, i.e. the passage for the sausage skin, substantially equals the advancing speed of sausage strand 5 as determined by endless conveyor belts 10.

As sausage strand 5 is being constricted by constrictor elements 9 it continues to be rotated until the leading end of the already divided sausage 13 is gripped between endless conveyor belts 10 and the sausage strand is again constricted at the trailing end of the respective sausage. The subsequent rotation of the upstream section of sausage strand 5 then causes the trailing end of the sausage to be B twisted together.

When constrictor elements 9 revolve at a constant speed, the produced sausages are of a determined length and have a determined portion size for a constant calibre When it is now desired to produce sausages of a greater length, electronic control unit 4 controls the revolving speed of constrictor elements 9 in such a manner that they revolve at a slower speed in their inoperative state, i.e. out of engagement with sausage strand 5.

In order to permit sausages of a very great length to be produced, the revolving speed of constrictor elements 9 can be reduced to Zero in their inoperative phase, so that they remain stationary for a certain time. For enabling the sausage strand to be properly divided even under these conditions, the rotation of retaining ring 1 is also stopped, so that sausage strand 5 is not rotated and can therefore smoothly enter the space between endless belts 10.

The rotation of retaining ring 1 is only resumed when constrictor elements 9 are operated to constrict sausage strand 5 to thereby divide a sausage of very great length from the strand.

The V-shaped configuration of constrictor elements 9 permits them to be used for constricting sausage strands in a range of diameters between about 13 mm and about 30 mm.

When it is intended to produce sausages of a still greater calibre dK, constrictor elements 9 can be readily and quickly exchanged with other ones as can likewise be retaining ring 1. In this case the distance Y between endless belts 10 has to be increased in the conventional manner. In addition it is also possible to increase the spacing of output shafts 8 accordingly.

When the revolving speed of constrictor elements 9 during their inoperative phase is increased, the thus produced sausages are of shorter length. The shortest sausage length is determined by the distance a in FIG. 2, itself determined by the radius rT of the return pulleys and the length rV of constrictor elements 9.

I claim:

1. A method for dividing a continuous sausage strand exiting from a filling machine into individual sausages comprising the steps of:
   a) discharging continuously a stuffed sausage strand from a filling machine;
   b) rotating said strand about its axis as it moves downstream from said machine;
   c) constricting said strand at preselected spaced locations with a pair of rotating constrictor elements that rotate periodically into closely spaced position to divide the strand into individual sausages, said elements rotating about an axis perpendicular to the axis of the strand on either side of the strand, the rotational speed of the constrictor elements being variable between their speed when they are in engagement with the strand and the speed when they are disengaged from the strand to thereby vary the length of the divided sausages; and
   subsequent to completion of the constricting step, continuously conveying the thus divided sausage strand always from the rotating elements while preventing it from being rotated.

2. Apparatus for dividing a continuously moving sausage strand exiting from a filling machine into individual sausages comprising twisting means for rotating said sausage strand about its axis, a constrictor mechanism for dividing the strand into individual sausages, said mechanism comprising a pair of constrictor elements mounted for rotation in opposite directions of either side of said strand and adapted to be brought into closely spaced position relative to one another to periodically engage and thereby constrict said sausage strand and drive means for rotating said elements, conveyor means located downstream of said constrictor mechanism for conveying the thus divided sausage strand away from said mechanism while preventing it from being rotated and control means for varying the rotational speed of the constrictor elements between the time they are engaged with the continuously moving strand and the time they are disengaged therefrom to thereby vary the length of said divided sausages.

3. The apparatus of claim 2, wherein said drive means for said constrictor elements comprises a variable-speed electric motor and a transmission having two drive shafts disposed on opposite sides of said sausage strand, each of said drive shafts having a pennant-shaped constrictor element mounted thereon.

4. The apparatus of claim 3, wherein said drive means for said constrictor elements comprises two synchronously rotating variable-speed electric motors disposed on opposite sides of said sausage strand, the output shaft of each said electric motors being provided with a pennant-shaped constrictor element mounted thereon.

5. The apparatus of claim 3, including a separate drive mechanism for said conveyor means having a variable-speed electric motor.

6. The apparatus of claim 3, which said means for twisting said sausage strand comprises a separate drive mechanism having a variable-speed electric motor.

7. The apparatus of claim 3, in which said constrictor elements are removable so as to be replaceably by other constrictor elements for a different range of sausage diameters.

* * * * *

UNITED STATES PATENT AND TRADEMARK OFFICE
CERTIFICATE OF CORRECTION

PATENT NO. : 5,049,108

DATED : September 17, 1991

INVENTOR(S) : Georg Staudenrausch

It is certified that error appears in the above-identified patent and that said Letters Patent is hereby corrected as shown below:

Claim 1, column 5, line 33, before "subsequent" insert --d)--;

line 35, change "always" to --away--.

Claim 4, column 6, line 23, change "claim 3" to --claim 2--.

Claim 5, column 6, line 29, change "claim 3" to --claim 2--.

Claim 6, column 6, line 32, change "claim 3" to --claim 2--, and before "which" insert --in--.

Claim 7, column 6, line 35, change "claim 3" to

UNITED STATES PATENT AND TRADEMARK OFFICE
CERTIFICATE OF CORRECTION

PATENT NO. : 5,049,108

DATED : September 17, 1991

INVENTOR(S) : Georg Staudenrausch

It is certified that error appears in the above-identified patent and that said Letters Patent is hereby corrected as shown below:

--claim 2--;

line 36, change "replaceably" to --replaceable--.

Signed and Sealed this

Twenty-seventh Day of April, 1993

Attest:

MICHAEL K. KIRK

Attesting Officer

Acting Commissioner of Patents and Trademarks